United States Patent
Chernysheva et al.

(10) Patent No.: US 10,030,087 B2
(45) Date of Patent: Jul. 24, 2018

(54) METHOD FOR MANUFACTURING FLUOROELASTOMERS

(75) Inventors: Liubov Chernysheva, Caronno Pertusella (IT); Bradley Lane Kent, Woolwich Township, NJ (US); Giovanni Comino, Monza (IT); Valeriy Kapelyushko, Alessandria (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 563 days.

(21) Appl. No.: 14/114,799

(22) PCT Filed: May 2, 2012

(86) PCT No.: PCT/EP2012/058018
§ 371 (c)(1),
(2), (4) Date: Oct. 30, 2013

(87) PCT Pub. No.: WO2012/150256
PCT Pub. Date: Nov. 8, 2012

(65) Prior Publication Data
US 2014/0058052 A1  Feb. 27, 2014

Related U.S. Application Data

(60) Provisional application No. 61/481,988, filed on May 3, 2011.

(30) Foreign Application Priority Data

Jun. 7, 2011 (EP) .................................... 11169011

(51) Int. Cl.
*C08F 214/28* (2006.01)
*C08F 214/22* (2006.01)

(52) U.S. Cl.
CPC .......... *C08F 214/28* (2013.01); *C08F 214/22* (2013.01); *C08F 214/222* (2013.01); *C08F 214/225* (2013.01)

(58) Field of Classification Search
USPC .................................................. 526/255, 93
See application file for complete search history.

(56) References Cited

U.S. PATENT DOCUMENTS

| | | |
|---|---|---|
| 3,752,787 A | 8/1973 | De Brunner |
| 3,876,654 A | 4/1975 | Pattison |
| 4,035,565 A | 7/1977 | Apotheker et al. |
| 4,233,427 A | 11/1980 | Bargain et al. |
| 4,243,770 A | 1/1981 | Tatemoto et al. |
| 4,259,463 A | 3/1981 | Moggi et al. |
| 4,281,092 A | 7/1981 | Breazeale |
| 4,394,489 A | 7/1983 | Aufdermarsh |
| 4,564,662 A | 1/1986 | Albin |
| 4,694,045 A | 9/1987 | Moore |
| 4,745,165 A | 5/1988 | Arcella et al. |
| 4,943,622 A | 7/1990 | Naraki et al. |
| 5,173,553 A | 12/1992 | Albano et al. |
| 5,447,993 A | 9/1995 | Logothetis |
| 5,654,373 A * | 8/1997 | Kruger .................. C08F 214/18 525/326.3 |
| 5,767,204 A | 6/1998 | Iwa et al. |
| 5,789,489 A | 8/1998 | Coughlin et al. |
| 5,789,509 A | 8/1998 | Schmiegel |
| 6,667,372 B1 * | 12/2003 | Miyake ..................... C08F 2/10 526/61 |
| 2006/0025528 A1 * | 2/2006 | Apostolo ................ C07C 41/48 525/199 |
| 2013/0264522 A1 * | 10/2013 | Stanga ..................... C08F 14/22 252/500 |

FOREIGN PATENT DOCUMENTS

| | | | |
|---|---|---|---|
| EP | 120462 | A1 | 10/1984 |
| EP | 136596 | A2 | 4/1985 |
| EP | 182299 | A2 | 5/1986 |
| EP | 199138 | A2 | 10/1986 |
| EP | 335705 | A1 | 10/1989 |
| EP | 391421 | A2 | 10/1990 |
| EP | 410351 | A1 | 1/1991 |
| EP | 461521 | A1 | 12/1991 |
| EP | 596318 | A2 | 5/1994 |
| EP | 661304 | A1 | 7/1995 |
| EP | 684277 | A1 | 11/1995 |
| EP | 860436 | A1 | 8/1998 |
| EP | 1591461 | A1 | 11/2005 |
| EP | 1591479 | A1 * | 11/2005 |
| EP | 1798253 | A1 | 6/2007 |
| EP | 1845116 | A1 | 10/2007 |
| JP | 2003-171407 | A * | 6/2003 |

(Continued)

OTHER PUBLICATIONS

Pianca M. et al.,"End groups in fluoropolymers", Journal of Fluorine Chemistry, 1999, vol. 95, p. 71-84—Elsevier Science S.A.*

(Continued)

*Primary Examiner* — Mark Kaucher
*Assistant Examiner* — Henry Hu

(57) ABSTRACT

The invention pertains to a process for manufacturing a fluoroelastomer [fluoroelastomer (A)] having a heat of fusion of less than 5 J/g as measured by ASTM D-3418-08, said method comprising emulsion polymerizing vinylidene fluoride (VDF) in the presence of at least one additional fluorinated monomer, in an aqueous polymerization medium, said method comprising polymerizing VDF and said additional fluorinated monomer(s) in the presence of a redox radical initiator system comprising: —at least one organic oxidizing agent [agent (O)]; —at least one organic reducing agent [agent (R)]; wherein agent (O) is fed to said polymerization medium separately from agent (R), so that agent (O) comes in contact with agent (R) exclusively in said polymerization medium comprising VDF and optional additional monomer(s), to fluoroelastomers having low amount of chain defects and low amount of polar end groups, notably obtainable from said process, and to curable compositions therefrom.

19 Claims, No Drawings

(56) References Cited

FOREIGN PATENT DOCUMENTS

| | | |
|---|---|---|
| JP | 2003171407 A | 6/2003 |
| WO | 9502634 A1 | 1/1995 |
| WO | 9705122 A1 | 2/1997 |
| WO | 9838242 A1 | 9/1998 |
| WO | 2004041878 A1 | 5/2004 |
| WO | 2007085546 A1 | 8/2007 |
| WO | 2008080897 A1 | 7/2008 |
| WO | 2010003929 A1 | 1/2010 |
| WO | 2011073344 A1 | 6/2011 |
| WO | WO-2012/150253 A1 * | 11/2012 |

OTHER PUBLICATIONS

ASTM D 3418-08, "Standard Test Method for Transition Temperatures and Enthalpies of Fusion and Crystallization of Polymers by Differential Scanning Calorimetry", 2008, pp. 1-7.

* cited by examiner

METHOD FOR MANUFACTURING FLUOROELASTOMERS

CROSS-REFERENCE TO RELATED APPLICATIONS

This application is a U.S. national stage entry under 35 U.S.C. § 371 of International Application No. PCT/EP2012/058018 filed May 2, 2012, which claims priority to U.S. Provisional Application Ser. No. 61/481,988, filed May 3, 2011 and to European Application No. 11169011.1, filed Jun. 7, 2011. The entire contents of these applications are explicitly incorporated herein by this reference.

TECHNICAL FIELD

This invention is in the domain of emulsion polymerization techniques for yielding fluoroelastomers by polymerizing fluoromonomers, in particular vinylidene fluoride, in the presence of organic radical initiators, and to fluoroelastomers therefrom.

BACKGROUND ART

Vulcanized (per)fluoroelastomers have been used in a variety of applications, in particular for manufacturing sealing articles such as oil seals, gaskets, shaft seals and O-rings, because of several desirable properties such as heat resistance, chemical resistance, weatherability, etc.

A frequently used method for manufacturing (per)fluoroelastomers involves aqueous emulsion polymerization of one or more fluorinated monomers generally in the presence of fluorinated surfactants. It is well known in the art that the use of inorganic initiators, e.g. persulfates, generally lead to the formation of polar end groups in the polymer chain, because of the initiating mechanism; among said groups, mention can be made of $SO_3^-$ groups, carboxylic groups in whichever form, hydroxyl groups and the like. These groups, even if present in low concentration, are generally considered as main responsible for thermal or oxidative lack of stability and/or for interfering with curing processes.

Organic initiators are thus generally initiators of choice when polymers free from polar end-groups and thus more thermally stable and having a lean curing behaviour are to be manufactured by emulsion polymerization.

Nevertheless, when producing fluoroelastomers, more particularly vinylidene fluoride (VDF) fluoroelastomers, by emulsion polymerization in the presence of said organic initiators, the formation of radicals is triggered by thermal decomposition of these latter. Nevertheless, often, these organic compounds have no appreciable decomposition kinetic at temperatures below 100° C.; thus, polymerization conditions required for achieving suitable polymerization rate might be as high as 120° C. or more. As a consequence of these 'high T' conditions, polymer chain is submitted to various side-reactions, including rearrangements, back-bitings, transfer to polymer and the like, finally resulting in chain defects, which might compromise mechanical and tensile properties of the fluoroelastomer matrix and processing behaviour of the fluoroelastomer and of its compounds In particular, it is known that when polymerizing VDF at high temperature, polymer backbone is generally interrupted by short chain branches terminated by end groups of formula —$CF_2H$ and/or —$CF_2CH_3$, which typically originate from intra-chain transfer (back-biting) as shown, e.g. in scheme here below:

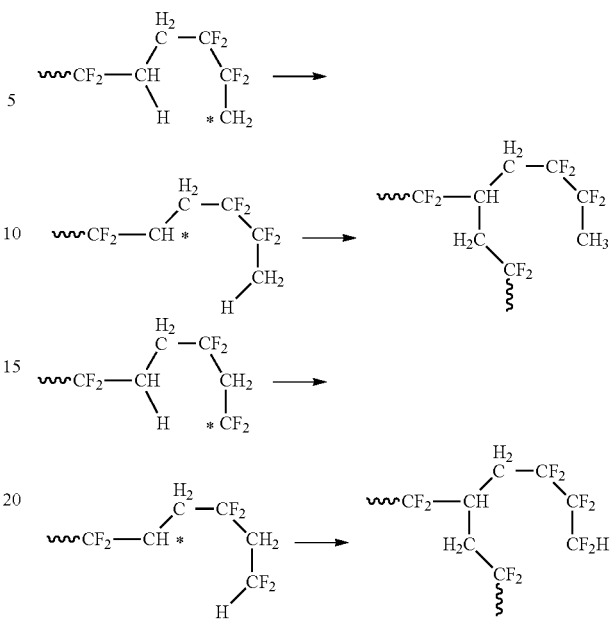

Further, in addition, transfer to polymer phenomena involving attack on —$CH_2$— moieties of VDF recurring units might additionally generate, in particular at high temperature, long chain branches and additional —$CF_2H$ end groups, as shown in scheme herein below:

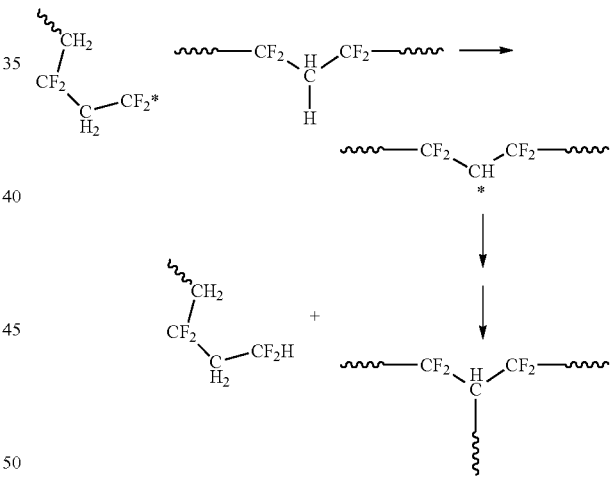

On the other side, polymerization techniques based on the use as radical initiating system of a redox system, comprising at least an oxidant and a reducing agent enabling easier decomposition of said oxidant are known.

Thus, EP 0461521 A (DAIKIN IND LTD) 18 Dec. 1991 discloses a process for manufacturing VDF polymers by certain radical polymerization processes. Among suitable techniques, mention is notably made of suspension polymerization techniques, including the use of organic radical initiators; or, as an alternative, of emulsion polymerization techniques using any of ammonium persulfate, potassium persulfate, hydrogen peroxide, or a mixture of any of these inorganic peroxides with a reducing agent such as ferrous sulfate and a stabilizer such as I-ascorbic acid.

Also, EP 1591461 A (ARKEMA INC) 2 Nov. 2005 discloses the emulsion polymerization of VDF in the presence of certain hydrogenated surfactants in combination with a radical initiator. Said radical initiator can be a redox system made of an oxidizing agent, a reducing agent and a promoter acting as an electron transfer medium; the oxidizing agent can be notably a hydroperoxide, such as ter-butyl hydroperoxide and cumene hydroperoxide; the reducing agent can be ascorbic acid; the promoter can be a transition metal salt, such as notably ferrous sulphate.

Furthermore, use of these redox systems is extremely delicate and mere addition of oxidizing/reducing agent might lead either to no polymerization at all or, under certain cases, to uncontrolled kinetics and/or substantial fouling phenomena, so that the expected aim, i.e. effective production of a fluoroelastomer having substantially no polar group and regular defect-free structure cannot be achieved.

There is thus still a current shortfall in the art for method for manufacturing fluoroelastomers, in particular VDF-based fluoroelastomers, possessing substantially no polar end group, thus being endowed with improved thermal and oxidative stability, and more ordered structure, with limited defects.

SUMMARY OF INVENTION

The Applicant has now surprisingly found that it is possible to manufacture vinylidene fluoride fluoroelastomers by emulsion polymerization with redox initiator system, provided that certain ingredients and addition methodologies are followed, for obtaining materials having extremely regular polymer chain with no or substantially no polar end group.

It is thus an object of the present invention a process for manufacturing a fluoroelastomer [fluoroelastomer (A)] having a heat of fusion of less than 5 J/g as measured by ASTM D-3418-08, said method comprising emulsion polymerizing vinylidene fluoride (VDF) in the presence of at least one additional fluorinated monomer, in an aqueous polymerization medium, said method comprising polymerizing VDF and said additional fluorinated monomer(s) in the presence of a redox radical initiator system comprising:
at least one organic oxidizing agent [agent (O)];
at least one organic reducing agent [agent (R)];
wherein agent (O) is fed to said polymerization medium separately from agent (R), so that agent (O) comes in contact with agent (R) exclusively in said polymerization medium comprising VDF and optional additional monomer(s).

The Applicant has surprisingly found that, when using organic compounds both as agent (O) and agent (R), only by achieving mixing of agent (O) and agents (R) in the polymerization medium wherein polymerizable monomer(s) is/are present, it is advantageously possible to effectively generated radicals at low temperature causing polymerization of monomers to be efficiently initiated and yielding the expected fluoroelastomer material with reduced polar groups and chain defects (inversions, back-biting, long and short branches . . . ), without any fouling phenomenon. Comparative runs wherein said agent (O) and agents (R) are fed as a single mixture, even if maintained at low temperature before injection in the polymerization medium, no significant reaction rate could be achieved.

The method of the invention is a method for emulsion polymerization, that is to say which emulsion, otherwise known as 'dispersion', polymerization, including micro- or nano-emulsion, is concerned, providing thus generally as a result of the polymerization method a dispersion of particles of the polymer in the aqueous medium. The emulsion polymerization method is thus notably distinguishable from suspension polymerization and/or from solution polymerization techniques, well known to those skilled in the art.

In the method of the invention VDF is polymerized with at least one additional fluorinated monomer.

Non-limitative examples of suitable fluorinated monomers include, notably, the followings:
(a) $C_2$-$C_8$ perfluoroolefins like, e.g., tetrafluoroethylene (TFE), hexafluoropropene (HFP) and hexafluoroisobutene;
(b) $C_2$-$C_8$ hydrogenated fluoroolefins like, e.g., trifluoroethylene (TrFE) and vinyl fluoride;
(c) $C_2$-$C_8$ chloro- and/or bromo- and/or iodo-fluoroolefins like, e.g., chlorotrifluoroethylene (CTFE);
(d) (per)fluoroalkyl vinyl ethers (PAVE) of formula $CF_2=CFOR_f$, wherein $R_f$ is a $C_1$-$C_6$ (per)fluoroalkyl group, like, e.g., a —$CF_3$, a —$C_2F_5$ or a —$C_3F_7$ perfluoroalkyl group;
(e) (per)fluorooxyalkyl vinyl ethers of formula $CF_2=CFOX$, wherein X is a $C_1$-$C_{12}$ (per)fluorooxyalkyl group containing one or more ether groups, like, e.g., perfluoro-2-propoxypropyl group;
(f) (per)fluorodioxoles of formula:

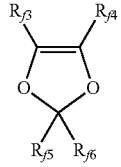

wherein $R_{f3}$, $R_{f4}$, $R_{f5}$ and $R_{f6}$, equal to or different from each other, are independently selected from a fluorine atom or a $C_1$-$C_6$ (per)fluoroalkyl group optionally comprising one or more oxygen atoms, preferably a —$CF_3$, a —$C_2F_5$, a —$C_3F_7$, a —$OCF_3$ or a —$OCF_2CF_2OCF_3$ group;
(g) (per)fluoromethoxyvinyl ethers (MOVEs) having general formula $CFX_2=CX_2OCF_2OR''_f$, wherein $R''_f$ is selected from linear and branched $C_1$-$C_6$ (per)fluoroalkyl groups, cyclic $C_5$-$C_6$ (per)fluoroalkyl groups and linear or branched $C_2$-$C_6$ (per)fluorooxyalkyl groups, containing from one to three oxygen atoms, and $X_2$ is F or H; preferably, $X_2$ is F and $R''_f$ is a —$CF_2CF_3$ group (MOVE1), a —$CF_2CF_2OCF_3$ group (MOVE2) or a —$CF_3$ group (MOVE3).

The polymerization may further involve non-fluorinated monomers like, e.g., $C_2$-$C_8$ hydrogenated olefins.

Still further, the polymerization may involve monomers having at least one functional group like, e.g., a group capable of participating in a peroxide cure reaction; these monomers are often referred to as cure-site monomers. Such functional groups include, notably, halogen atoms like, e.g., bromine or iodine atoms as well as nitrile groups.

According to these embodiments, among cure-site monomers, mention can be notably made of:
(CSM-1) iodine or bromine containing monomers of formula:

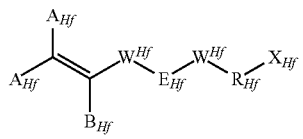

wherein each of $A_{Hf}$, equal to or different from each other and at each occurrence, is independently selected from F, Cl, and H; $B_{Hf}$ is any of F, Cl, H and $OR^{Hf}_B$, wherein $R^{Hf}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $R_{Hf}$ is a halogen atom selected from the group consisting of Iodine and Bromine; which may be inserted with ether linkages; preferably $E_{Hf}$ is a —$(CF_2)_m$— group, with m being an integer from 3 to 5;
(CSM-2) ethylenically unsaturated compounds comprising cyanide groups, possibly fluorinated.

Among cure-site containing monomers of type (CSM1), preferred monomers are those selected from the group consisting of:
(CSM1-A) iodine-containing perfluorovinylethers of formula:

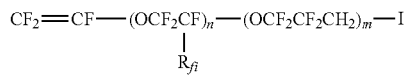

with m being an integer from 0 to 5 and n being an integer from 0 to 3, with the provisio that at least one of m and n is different from 0, and $R_{fi}$ being F or $CF_3$; (as notably described in U.S. Pat. No. 4,745,165 (AUSIMONT SPA) 17 May 1988, U.S. Pat. No. 4,564,662 (MINNESOTA MINING) 14 Jan. 1986 and EP 199138 A (DAIKIN IND LTD) 29 Oct. 1986; and
(CSM-1 B) iodine-containing ethylenically unsaturated compounds of formula:

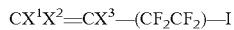

wherein each of $X^1$, $X^2$ and $X^3$, equal to or different from each other, are independently H or F; and p is an integer from 1 to 5; among these compounds, mention can be made of $CH_2$=$CHCF_2CF_2I$, $I(CF_2CF_2)_2CH$=$CH_2$, $ICF_2CF_2CF$=$CH_2$, $I(CF_2CF_2)_2CF$=$CH_2$; (CSM-1C) iodine-containing ethylenically unsaturated compounds of formula:

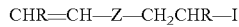

wherein R is H or $CH_3$, Z is a $C_1$-$C_{18}$ (per)fluoroalkylene radical, linear or branched, optionally containing one or more ether oxygen atoms, or a (per)fluoropolyoxyalkylene radical; among these compounds, mention can be made of $CH_2$=$CH$—$(CF_2)_4$—$CH_2CH_2I$, $CH_2$=$CH$—$(CF_2)_6$ $CH_2CH_2I$, $CH_2$=$CH$—$(CF_2)_8CH_2CH_2I$, $CH_2$=$CH$—$(CF_2)_2CH_2CH_2I$;
(CSM-1D) bromo and/or iodo alpha-olefins containing from 2 to 10 carbon atoms such as bromotrifluoroethylene or bromotetrafluorobutene described, for example, in U.S. Pat. No. 4,035,565 (DUPONT) 12 Jul. 1977 or other compounds bromo and/or iodo alpha-olefins disclosed in U.S. Pat. No. 4,694,045 (DUPONT) 15 Sep. 1987.

Among cure-site containing monomers of type (CSM2), preferred monomers are those selected from the group consisting of:
(CSM2-A) perfluorovinyl ethers containing cyanide groups of formula $CF_2$=$CF$—$(OCF_2CFX^{CN})_m$—$O$—$(CF_2)_n$—$CN$, with $X^{CN}$ being F or $CF_3$, m being 0, 1, 2, 3 or 4; n being an integer from 1 to 12;
(CSM2-B) perfluorovinyl ethers containing cyanide groups of formula $CF_2$=$CF$—$(OCF_2CFX^{CN})_{m'}$—$O$—$CF_2$—$CF(CF_3)$—$CN$, with $X^{CN}$ being F or $CF_3$, m' being 0, 1, 2, 3 or 4.

Specific examples of cure-site containing monomers of type CSM2-A and CSM2-B suitable to the purposes of the present invention are notably those described in U.S. Pat. No. 4,281,092 (DUPONT) 28 Jul. 1981, U.S. Pat. No. 5,447,993 (DUPONT) 5 Sep. 1995 and U.S. Pat. No. 5,789,489 (DUPONT) 4 Aug. 1998.

The choice of the organic oxidizing agent [agent (O)] is not particularly limited. Any of those organic initiators which are known to initiate polymerization of vinylidene fluoride can be used. Among them, mention can be made of:
diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide;
dialkylperoxides, including notably ditertbutylperoxide (DTBP);
hydroperoxides, including notably t-butyl hydroperoxide (TBHP), cumene hydroperoxide, tertiaryamylhydroperoxide;
per-acids esters and salts thereof such as e.g. ammonium, sodium or potassium salts. Examples of per-acids include peracetic acid. Esters of the peracid can be used as well and examples thereof include tert-butylperoxyacetate and tert-butylperoxypivalate;
peroxydicarbonates, including notably diisopropylperoxydicarbonate, di-n-propylperoxydicarbonate.

Similarly, selection of the organic reducing agent [agent (R)] is not particularly limited. The skilled in the art will select most appropriate agent (R) on the basis of the other component(s) of the redox radical initiator system. Generally, the organic reducing agent (R) is selected from oxalic acid, ascorbic acid, formic acid, malonic acid, citric acid, a reducing sugar (i.e. any sugar having an aldehyde or a ketone group), N-nitrosamine, hydroxylamines. Among all these agents (R), ascorbic acid is preferred.

As used herein, the term 'ascorbic acid' includes additionally the isomers of ascorbic acid such as iso-ascorbic acid (erythorbic acid), as well as corresponding salts, e.g. sodium ascorbate, calcium ascorbate, potassium ascorbate.

Optionally, an inorganic oxidizing agent (IO) might be used in combination with the agent (P) and the agent (O). As non (imitative examples of inorganic oxidizing agents, mention can be made of persulfates, e.g. potassium persulfate, ammonium persulfate, sodium persulfate.

The use of such agent (IO), without being mandatory, might be recommended under certain circumstances for generating a certain amount of polar end group, which can be of help in improving fluoroelastomer (A) latex stability and subsequent work-up during coagulation, so as to reduce/minimize stickiness of the coagulated crumb.

Nevertheless, the amount of agent (IO) is generally selected so as to ensure that the amount of polar end groups, while not being zero, will remain low and advantageously ensuring, notably, an amount of groups of formula —$CF_2CH_2OH$ in an amount of at most 5, preferably at most 4, more preferably at most 3 mmoles per kg of fluoroelastomer.

When used, it is thus understood that this agent (IO) will be used in a molar ratio of at least 1/1000, preferably of 1/500, more preferably of 1/100 with respect to the agent (O) and/or in a molar ratio of at most 1/5, preferably 1/10 with respect to the agent (O). A molar ratio of about 1/15 was found to provide particularly good results.

According to a first embodiment of the invention, the redox radical initiator system of the method of the invention comprises:
- at least one organic oxidizing agent [agent (O)];
- at least one organic reducing agent [agent (R)];
- optionally at least one inorganic oxidizing agent (IO); and
- a transition metal catalyst [agent (P)].

Preferably, the redox radical initiator system of the invention consists essentially of the agent (O), the agent (R), optionally the agent (OI) and the agent (P).

It is understood that according to this embodiment, the selection of the agent (R) will be made as a function of transition metal catalyst employed and of organic oxidizing agent employed.

As per the transition metal catalyst [agent (P)], generally those comprising $Fe^{2+}$, $Cu^{+1}$, $Co^{2+}$, $Ag^+$, $Ti^{2+}$ are preferred. Any complex or salt of these metals can be advantageously used. Salts of $Fe^{2+}$ are those which have provided best performances in the method of the invention.

Without the Applicant being bound by this theory, it appears that in the method of the present invention, the agent (P) advantageously catalyzes the decomposition of the oxidizing agent (O), with subsequent release of radicals species able to initiate polymerization; in this process, the transition metal is oxidized to its higher oxidation states; the organic reducing agent (R) thus intervenes to restore initial oxidation state of the metal catalyst, bringing the same to its former lower oxidation state.

Polymerization rates achievable in the method of the invention with the redox radical initiator system of this first embodiment are particularly fast. Under certain circumstances while this might be generally considered as a clear advantage providing improved throughput of a given production line, it might also require additional measures for an attentive control of kinetics, for avoiding instabilities, oscillations, run-away phenomena and the like.

Further, the use of a transition metal catalyst [agent (P)] might provide for metal residues in the fluoroelastomer (A).

According to a second embodiment of the invention, the redox radical initiator system of the method of the invention comprises:
- at least one organic oxidizing agent [agent (O)];
- at least one organic reducing agent [agent (R)];
- optionally at least one inorganic oxidizing agent (IO);
and said redox radical initiator system is substantially free from any salt of $Fe^{2+}$, $Cu^{+1}$, $Co^{2+}$, $Ag^+$, $Ti^{2+}$.

Preferably, the redox radical initiator system of the invention consists essentially of the agent (O), the agent (R), and optionally of the agent (OI).

In other terms, according to this second embodiment of the invention, no use is made of certain transition metal catalysts which have been found to possibly have a negative impact on post-processing.

The Applicant has surprisingly found that when using organic agents as oxidizing and reducing component of the system, despite transition metal catalysts are generally recommended for use in redox systems, optimal polymerization kinetics can be obtained by the simple combination of agent (O) and agent (R), thus advantageously avoiding contamination of the fluoroelastomer (A) with any transition metal contaminant, which might deleteriously affect properties of the same.

Typically the method of the invention comprises polymerizing in the presence of a surfactant, even though embodiments wherein no surfactant is added might also still encompassed.

Choice of the surfactant will be made by the skilled in the art for ensuring adequate stabilization of the polymer particles in the aqueous phase. Both fluorinated and hydrogenated surfactants can be used.

Typically fluorinated surfactants, and preferably fluoroether carboxylic acids or salts surfactants (comprising one or more than one ethereal oxygens) are used; pre-formed mixtures comprising at least one fluorinated polyether carboxylic acid or salt surfactant and at least one fluorinated fluid free from ionisable groups (e.g. a perfluoropolyether oil) can equally be used, and are generally referred to as micro-emulsions.

The polymerization process of the invention is carried out at temperatures typically ranging between 5° C. and 200° C., preferably between 20° C. and 150° C.

Particularly preferred are temperatures of 70 to 90° C.

The polymerization process is carried out at pressures typically ranging between 2 and 80 bar, preferably between 5 and 60 bar.

Particularly preferred are pressures of 30 to 40 bar.

Chain transfer agent can be advantageously used in the method of the present invention. Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$ and hydrofluorocarbon compounds such as $CH_2F$—$CF_3$ (R134a). Additionally esters like ethylacetate, malonic esters can be effective as chain transfer agent in the process of the invention.

According to certain preferred embodiment of the invention, iodine and/or bromine containing compounds are used as chain transfer agent in the process of the invention, so as to advantageously provide a fluoroelastomer (A) comprising iodine and/or bromine cure sites as terminal groups of the fluoroelastomer polymer chain; the fluoroelastomer according to this embodiment is generally obtained by addition to the polymerization medium during fluoroelastomer manufacture of anyone of:
- iodinated and/or brominated chain-transfer agent(s); suitable chain-chain transfer agents are typically those of formula $R^f(I)_x(Br)_y$, in which $R^f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND LTD) 6 Jan. 1981 and U.S. Pat. No. 4,943,622 (NIPPON MEKTRON KK) 24 Jul. 1990); and
- alkali metal or alkaline-earth metal iodides and/or bromides, such as described notably in U.S. Pat. No. 5,173,553 (AUSIMONT SRL) 22 Dec. 1992.

As mentioned, it is essential that agent (O) comes in contact with agent (R) and, possibly, agent (P) exclusively in said polymerization medium.

While agent (P), if present, and agent (R) can be fed separately from each other in the polymerization medium, they also can be fed therein as a unique mixture, preferably as an aqueous solution of agent (P) and agent (R).

Nevertheless, embodiments wherein at least a portion of agent (O) or at least a portion of agent (R) and/or (P) (when present) are introduced in the polymerization medium before the start of the polymerization (e.g. in the absence of the monomer(s)) are still encompassed by the scope of the present invention.

According to these embodiments, should at least a fraction of agent (O) be present in the polymerization medium, the start of the reaction will be provided by the addition of agent (R).

It is nevertheless understood that typically introduction of agents (O), (R) and, when present, agent (P) will begin more or less simultaneously.

Another aspect of the invention pertains to a fluoroelastomer (A) comprising recurring units derived from vinylidene fluoride and from at least one additional fluorinated monomer (as above detailed), said fluoroelastomer comprising:

end groups of formula —CF$_2$H and/or —CF$_2$CH$_3$ in an amount of at most 60, preferably of at most 50 mmoles, more preferably at most 40 mmoles per kg of fluoroelastomer; and polar end groups of formula —CF$_2$CH$_2$OH in an amount of at most 5, preferably at most 4, more preferably at most 3 mmoles per kg of fluoroelastomer.

The fluoroelastomer (A) can be notably manufactured by means of the process of the present invention.

As above detailed, the combination of the substantial absence of both polar end chain and end groups due to branches is particularly advantageous with the aim of providing both improved mechanical properties (for example improved tensile strength at break), sealing performance (for example lower compression set) and excellent curing behaviour combined with an easier processing of the fluoroelastomer and compounds comprising the same.

Easier processing can be notably determined according to ASTM D5099—Measurement of Processing Properties Using Capillary Rheometry and ASTM D6204—Measurement of Unvulcanized Rheological Properties Using Rotorless Shear Rheometers.

Thus, the fluoroelastomer (A) is preferably selected among VDF-based copolymers, in which VDF is copolymerized with at least one comonomer chosen from the followings classes:

(a) C$_2$-C$_8$ perfluoroolefins, such as tetrafluoroethylene (TFE), hexafluoropropylene (HFP), hexafluoroisobutylene;

(b) hydrogen-containing C$_2$-C$_8$ olefins, such as vinyl fluoride (VF), trifluoroethylene (TrFE), perfluoroalkyl ethylenes of formula CH$_2$=CH—R$_f$, wherein R$_f$ is a C$_1$-C$_6$ perfluoroalkyl group;

(c) C$_2$-C$_8$ chloro and/or bromo and/or iodo-fluoroolefins such as chlorotrifluoroethylene (CTFE);

(d) (per)fluoroalkylvinylethers (PAVE) of formula CF$_2$=CFOR$_f$, wherein R$_f$ is a C$_1$-C$_6$ (per)fluoroalkyl group, e.g. CF$_3$, C$_2$F$_5$, C$_3$F$_7$;

(e) (per)fluoro-oxy-alkylvinylethers of formula CF$_2$=CFOX, wherein X is a C$_1$-C$_{12}$ ((per)fluoro)-oxyalkyl comprising catenary oxygen atoms, e.g. the perfluoro-2-propoxypropyl group;

(f) (per)fluorodioxoles having formula:

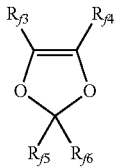

wherein R$_{f3}$, R$_{f4}$, R$_{f5}$, R$_{f6}$, equal or different from each other, are independently selected among fluorine atoms and C$_1$-C$_6$ (per)fluoroalkyl groups, optionally comprising one or more than one oxygen atom, such as notably —CF$_3$, —C$_2$F$_5$, —C$_3$F$_7$, —OCF$_3$, —OCF$_2$CF$_2$OCF$_3$; preferably, perfluorodioxoles;

(g) (per)fluoro-methoxy-vinylethers (MOVE, hereinafter) having formula:

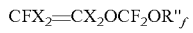

wherein R''$_f$ is selected among C$_1$-C$_6$ (per)fluoroalkyls, linear or branched; C$_5$-C$_6$ cyclic (per)fluoroalkyls; and C$_2$-C$_6$ (per)fluorooxyalkyls, linear or branched, comprising from 1 to 3 catenary oxygen atoms, and X$_2$=F, H; preferably X$_2$ is F and R''$_f$ is —CF$_2$CF$_3$ (MOVE1); —CF$_2$CF$_2$OCF$_3$ (MOVE2); or —CF$_3$ (MOVE3);

(h) C$_2$-C$_8$ non-fluorinated olefins (Ol), for example ethylene and propylene.

Optionally, fluoroelastomer (A) of the present invention further comprises recurring units derived from a cure-site monomer as above detailed, preferably of (CSM-1) or (CSM-2)-types, as above detailed.

Optionally, fluoroelastomer (A) of the present invention also comprises recurring units derived from a bis-olefin [bis-olefin (OF)] having general formula:

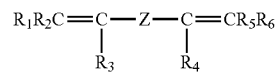

wherein R$_1$, R$_2$, R$_3$, R$_4$, R$_5$ and R$_6$, equal or different from each other, are H, halogen, a group R$_{OF}$ or OR$_{OF}$, wherein R$_{OF}$ is a C$_1$-C$_5$ alkyl radical which can be partially, substantially or completely fluorinated or chlorinated; Z is a linear or branched C$_1$-C$_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) 5 Jul. 1995.

The bis-olefin (OF) is preferably selected from the group consisting of those complying with formulae (OF-1), (OF-2) and (OF-3):

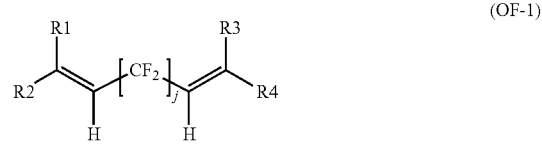

wherein j is an integer between 2 and 10, preferably between 4 and 8, and R$^1$, R$^2$, R$^3$, R$^4$, equal or different from each other, are H, F or C$_{1-5}$ alkyl or (per)fluoroalkyl group;

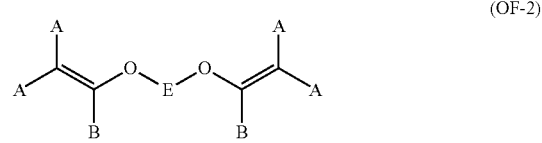

wherein each of A, equal or different from each other and at each occurrence, is independently selected from F, Cl, and H; each of B, equal or different from each other and at each occurrence, is independently selected from F, Cl, H and OR$_B$, wherein R$_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —(CF$_2$)$_m$— group, with m being an integer from 3 to 5; a preferred bis-olefin of (OF-2) type is $F_2C=CF-O-(CF_2)_5-O-CF=CF_2$.

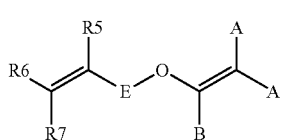

(OF-3)

wherein E, A and B have the same meaning as above defined; R5, R6, R7, equal or different from each other, are H, F or $C_{1-5}$ alkyl or (per)fluoroalkyl group.

Among specific compositions of fluoroelastomers (A) suitable for the purpose of the invention, mention can be made of the following compositions (in mol %):
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;
(ii) vinylidene fluoride (VDF) 50-80%, perfluoroalkyl vinyl ethers (PAVE) 5-50%, tetrafluoroethylene (TFE) 0-20%, bis-olefin (OF) 0-5%;
(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%, bis-olefin (OF) 0-5%;
(iv) tetrafluoroethylene (TFE) 50-80%, perfluoroalkyl vinyl ethers (PAVE) 20-50%, bis-olefin (OF) 0-5%;
(v) tetrafluoroethylene (TFE) 45-65%, $C_2$-$C_8$ non-fluorinated olefins (Ol) 20-55%, vinylidene fluoride 0-30%, bis-olefin (OF) 0-5%;
(vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%, bis-olefin (OF) 0-5%;
(vii) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;
(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%;
(ix) tetrafluoroethylene (TFE) 20-70%, fluorovinyl ethers (MOVE) 30-80%, perfluoroalkyl vinyl ethers (PAVE) 0-50%, bis-olefin (OF) 0-5%.

The invention also pertains to the use of the fluoroelastomer (A) as above described for fabricating shaped articles.

The fluoroelastomer (A) can then be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomer (A) into a finished article made of non-tacky, strong, insoluble, chemically and thermally resistant cured fluoroelastomer (A).

The fluoroelastomer (A) of the invention is advantageously cured by peroxide curing technique, by ionic technique, by tin-catalyzed curing or by a mixed peroxidic/ionic technique.

The peroxide curing is typically performed according to known techniques via addition of suitable peroxide that is capable of generating radicals by thermal decomposition. Organic peroxides are generally employed.

Still an object of the invention is thus a peroxide curable composition comprising fluoroelastomer (A) as above detailed and at least one peroxide, typically an organic peroxide.

Among most commonly used peroxides, mention can be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other suitable peroxide systems are those described, notably, in patent applications EP 136596 A (MONTEDISON SPA) 10 Apr. 1985 and EP 410351 A (AUSIMONT SRL) 30 Jan. 1991, whose content is hereby incorporated by reference.

Other ingredients generally comprised in the peroxide curable composition, as above detailed, are:
(a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines substituted with ethylenically unsaturated groups, such as notably those described in EP 860436 A (AUSIMONT SPA) 26 Aug. 1998 and WO 97/05122 (DU PONT [US]) 13 Feb. 1997; among above mentioned curing coagents, TAIC and bis-olefins (OF), as above detailed, and more specifically those of formula (OF-1), as above detailed, have been found to provide particularly good results;
(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;
(c) optionally, acid acceptors of the metal non-oxide type, such as 1,8-bis(dimethylamino)naphthalene, octadecylamine, etc., as notably described in EP 708797 A (DU PONT) 1 May 1996;
(d) optionally, other conventional additives, such as fillers, thickeners, pigments, antioxidants, stabilizers, processing aids, and the like.

Ionic curing can be achieved by mixing to the fluoroelastomer (A) one or more curing agent and one or more accelerator suitable for ionic curing, as well known in the art.

Still an object of the invention is thus an ionically curable composition comprising fluoroelastomer (A) as above detailed and at least one curing agent and at least one accelerator.

The amounts of accelerator(s) are generally comprised between 0.05 and 5 phr and that of the curing agent typically between 0.5 and 15 phr and preferably between 1 and 6 phr.

Aromatic or aliphatic polyhydroxylated compounds, or derivatives thereof, may be used as curing agents; examples thereof are described, notably, in EP 335705 A (MINNESOTA MINING & MFG [US]+) 4 Oct. 1989 and U.S. Pat. No. 4,233,427 (RHONE POULENC IND) 11 Nov. 1980. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, e.g., EP 335705 A (MINNESOTA MINING & MFG [US]+) 4 Oct. 1989 and U.S. Pat. No. 3,876,654 (DU PONT) 8 Apr. 1975); aminophosphonium salts (see, e.g., U.S. Pat. No. 4,259,463 (MONTEDISON SPA) 31 Mar. 1981); phosphoranes (see, e.g., U.S. Pat. No. 3,752,787 (DU PONT) 14 Aug. 1973); imine compounds of formula $[Ar_3P-N=PAr_3]^{+n}X^{n-}$, with Ar being an aryl group, n=1 or 2 and X being a n-valent anion as described in EP 0120462 A (MONTEDISON SPA) 3 Oct. 1984 or of formula $[(R_3P)_2N]^+X^-$, with R being an aryl or an alkyl group, and X being a monovalent anion, e.g. as described in EP 0182299 A (ASAHI CHEMICAL IND) 28 May 1986. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethyl-phosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in European patent application EP 0684277 A (AUSIMONT SPA [IT]) 29 Nov. 1995, which is included herein in its entirety by reference.

Other ingredients generally added to the ionically curable composition comprising fluoroelastomer (A) of the invention, when curing via ionic route are:
i) one or more mineral acid acceptors chosen from those known in the ionic curing of vinylidene fluoride copolymers, typically comprised in amounts of 1-40 parts per 100 parts of fluoroelastomer (A);
ii) one or more basic compounds chosen from those known in the ionic curing of vinylidene fluoride copolymers, typically added in amounts of from 0.5 to 10 parts per 100 parts of fluoroelastomer (A).

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the above mentioned metal salts; among the compounds of the type i), mention may be made of MgO.

The above mentioned amounts of the mixture are relative to 100 phr of fluoroelastomer (A). Also, other conventional additives, such as fillers, thickeners, pigments, antioxidants, stabilizers and the like, may then be added to the curing mixture.

Mixed peroxidic/ionic curing can be achieved by simultaneously introducing in the curable composition one or more peroxide, as above detailed, and one or more curing agent and one or more accelerator suitable for ionic curing, as well known in the art.

When the fluoroelastomer (A) comprises recurring units derived from ethylenically unsaturated compounds comprising cyanide groups of type (CSM-2) as above detailed, organotin compounds or diaromatic amine compounds, as notably described in U.S. Pat. No. 4,394,489 (DU PONT) 19 Jul. 1983 (disclosing allyl-, propargyl- and allenyl-tin curatives), U.S. Pat. No. 5,767,204 (NIPPON MEKTRON KK) 16 Jun. 1998 (providing bis(aminophenyl) compounds represented by formula:

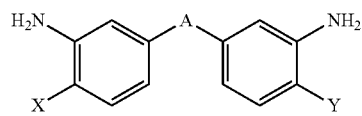

wherein A is an alkylidene group having 1 to 6 carbon atoms or a perfluoroalkylidene group having 1 to 10 carbon atoms and X and Y are a hydroxyl group or an amino group) and U.S. Pat. No. 5,789,509 (DU PONT) 4 Aug. 1998 (disclosing tetraalkyltin, tetraaryltin compounds, bis(aminophenols) and bis(aminothiophenols)). This type of vulcanization may be combined with a vulcanization of peroxide type, in the case where the fluoroelastomer matrix contains iodinated and/or brominated end groups, as described notably in U.S. Pat. No. 5,447,993 (DU PONT) 5 Sep. 1995.

Finally, the invention pertains to cured articles obtained from the fluoroelastomer (A). Said cured articles are generally obtained by moulding and curing the peroxide curable composition, as above detailed.

Should the disclosure of any of the patents, patent applications, and publications that are incorporated herein by reference conflict with the present description to the extent that it might render a term unclear, the present description shall take precedence.

The invention will be now described in more details with reference to the following examples whose purpose is merely illustrative and not intended to limit the scope of the invention.

EXAMPLE 1

Manufacture of a VDF/HFP Copolymer with t-Butyl Hydroperoxide, Ascorbic Acid and Ferrous Sulphate at 85° C.

Fluoroelastomer of example 1 was produced according to following procedure: in a 21 l horizontal autoclave, equipped with stirrer working at 60 rpm, were introduced, after evacuation 11.4 l of demineralized water and 114 ml of a perfluoropolyoxyalkylene microemulsion previously obtained by mixing:
24.79 ml of an acid terminated perfluoropolyoxyalkylene of formula: $CF_3O(CF_2-CF(CF_3)O)_n(CF_2O)_mCF_2COOH$, wherein n/m=10, and having an average molecular weight of 600;
8.71 ml of 30% by volume $NH_4OH$ aqueous solution;
65.66 ml demineralized water;
14.84 ml of GALDEN® D02 PFPE of formula:

wherein n/m=20, and having an average molecular weight of 450. The autoclave was then heated to 85° C. and maintained at such temperature for the entire duration of the reaction. A gazeous mixture of following monomers: vinylidene fluoride (VDF) 48% by moles and hexafluoropropene (HFP) 52% by moles was introduced in the autoclave so as to bring the pressure to 37 bar.

A 0.89% w/w solution of t-butyl hydroperoxide in DI water were pumped in at a speed of 420 mL/h; simultaneously but separately, a 0.89% w/w in L-ascorbic acid and 0.22% w/w in ferrous sulphate were pumped in at the same speed. Set-point pressure of 37 bar was maintained constant during polymerization by feeding a mixture consisting of: VDF 71.5% by moles; HFP 21.5% by moles.

After 158 min the autoclave was cooled, and the latex was discharged. 377.4 g/l of latex of a copolymer having molar monomer composition of 78.9% by mol of VDF and 21.1% by mol of HFP was obtained. Chain ends characterization of the obtained fluoroelastomer is provided in table 1.

COMPARATIVE EXAMPLE 2

Manufacture of a VDF/HFP Copolymer with Di-t-Butyl Peroxide at 121° C.

Fluoroelastomer of comparative example 2 was produced according to following procedure:

In a 21 l horizontal autoclave, equipped with stirrer working at 60 rpm, were introduced, after evacuation 15 l of demineralized water and 114 ml of a perfluoropolyoxyalkylene microemulsion previously obtained by mixing:

24.79 ml of an acid terminated perfluoropolyoxyalkylene of formula: $CF_3O(CF_2\text{—}CF(CF_3)O)_n(CF_2O)_mCF_2COOH$, wherein n/m=10, and having an average molecular weight of 600;

8.71 ml of 30% by volume $NH_4OH$ aqueous solution;

65.66 ml demineralized water;

14.84 ml of GALDEN® D02 PFPE of formula:

$CF_3O(CF_2\text{—}CF(CF_3)O)_n(CF_2O)_mCF_3$ wherein n/m=20, and having an average molecular weight of 450. The autoclave was then heated to 121° C. and maintained at such temperature for the entire duration of the reaction. A gazeous mixture of following monomers: vinylidene fluoride (VDF) 48% by moles and hexafluoropropene (HFP) 52% by moles was introduced in the autoclave so as to bring the pressure to 37 bar. 33.9 g of di-t-butyl peroxide (DTBP) were then introduced in step-wise additions, 6.44 g at the beginning of polymerization and 9 equal parts, each of 3.05 g for every 5% increment in the monomer conversion (last addition at 45% of conversion). Set-point pressure of 37 bar was maintained constant during polymerization by feeding a mixture consisting of: VDF 71.5% by moles; HFP 21.5% by moles. After 230 min the autoclave was cooled, and the latex was discharged. 278.6 g/l of latex of a copolymer having molar monomer composition of 78.8% by mol of VDF and 21.2% by mol of HFP was obtained. Chain ends characterization of the obtained fluoroelastomer is provided in table 1.

COMPARATIVE EXAMPLE 3

Manufacture of a VDF/HFP Copolymer with Ammonium Persulfate at 85° C.

Fluoroelastomer of comparative example 3 was produced according to following procedure:

In a 10 l vertical autoclave, equipped with stirrer working at 545 rpm, were introduced, after evacuation 5.6 l of demineralized water. The autoclave was then heated to 85° C. and maintained at such temperature for the entire duration of the reaction. A gazeous mixture of following monomers: vinylidene fluoride (VDF) 48% by moles and hexafluoropropene (HFP) 52% by moles was introduced in the autoclave so as to bring the pressure to 19 bar.

40 g of di-ammonium persulfate were then introduced in 2 steps, 12 g at the beginning of polymerization and 28 g at 70% of conversion (2660 g of monomer mixture fed to the reactor). Set-point pressure of 19 bar was maintained constant during polymerization by feeding a mixture consisting of: VDF 71.5% by moles; HFP 21.5% by moles.

After 77 min the autoclave was cooled, and the latex was discharged. 468 g/l of latex of a copolymer having molar monomer composition of 78.9% by mol of VDF and 21.1% by mol of HFP was obtained. Chain ends characterization of the obtained fluoroelastomer is provided in table 1.

Characterization of Chain-Ends of Fluoroelastomers

Chain ends were determined according to the method described in PIANCA, M., et al. End groups in fluoropolymers. *Journal of Flurine Chemistry*. 1999, vol. 95, p. 71-84. Concentration of relevant end chains are expressed both as mmoles per kg of polymer and as mmoles per kg of fluoroelastomer.

TABLE 1

| Run | | Ex. 1 | Ex. 2C | Ex. 3C |
|---|---|---|---|---|
| VDF | % mol | 78.9 | 78.8 | 78.9 |
| HFP | % mol | 21.1 | 21.5 | 21.1 |
| Chain end (mmol) per Kg of fluoroelastomer [mmol/kg] | | | | |
| —$CF_2H$ (a) | mmol/kg | 22 | 61 | 41 |
| —$CF_2CH_3$ (b) | mmol/kg | 6 | 18 | 9 |
| Total (a) + (b) | mmol/kg | 28 | 79 | 50 |
| —$CF_2CH_2OH$ | mmol/kg | n.d.* | n.d.* | 7 |

*n.d. = non detectable (i.e. inferior to the limit of detection, said limit being 0.05 mmol/kg).

EXAMPLE 4

Manufacture of a VDF/HFP Copolymer with t-Butyl Hydroperoxide, Ascorbic Acid and Ferrous Sulphate at 85° C.

In a 6483 liters horizontal reactor, equipped with stirrer working at 19 rpm, were introduced, after evacuation 3538 kg of demineralized water and 44.45 kg of perfluoropolyether microemulsion previously obtained by mixing:

13.74 kg (7.63 liters) of an acid terminated perfluoropolyoxyalkylene of formula:

CF$_3$O(CF$_2$—CF(CF$_3$)O)$_n$(CF$_2$O)$_m$CF$_2$COOH, wherein n/m=10, and having an average molecular weight of 600;
2.39 kg (2.68 liters) of 30% by volume NH$_4$OH aqueous solution;
20.23 kg of demineralized water;
8.09 kg (4.57 liters) of GALDEN® D02 PFPE of formula:

CF$_3$O(CF$_2$—CF(CF$_3$)O)$_n$(CF$_2$O)$_m$CF$_3$ wherein n/m=20, and having an average molecular weight of 450. The autoclave was then heated to 85° C. HFP and VDF were then separately introduced in the autoclave so as to ensure a weight ratio HFP/VDF of 2.19 wt/wt and to bring the pressure to 37 bar.

A 0.89% w/w solution of t-butyl hydroperoxide in deionized water was pumped in at an initial rate of 136 kg/h (300 lb/h); simultaneously but separately, a 0.89% w/w in L-ascorbic acid and 0.22% w/w in ferrous sulphate were pumped in at the same speed. Set-point pressure of 37 bar was maintained constant during polymerization by feeding a mixture consisting of VDF and HFP(HFP/VDF=0.6 wt/wt).

Ethyl acetate chain transfer agent (190 kg; 418 lbs) was added as a 5.6 wt % solution in water stepwise as a function of VDF consumption.

A very fast kinetic was observed at the beginning of the polymerization run, with temperature raising beyond 90° C.; temperature set point of 85° C. was restored after about 20-25 minutes and reaction was continued for about 4 hours, corresponding to the conversion of about 630 kg (1390 lbs) of VDF. No fouling was observed in the reactor.

EXAMPLE 5

Manufacture of a VDF/HFP Copolymer with t-Butyl Hydroperoxide, and Ascorbic Acid at 85° C.

In a 6483 liters horizontal reactor, equipped with stirrer working at 19 rpm, were introduced, after evacuation 2767 kg of demineralized water and 44.45 kg of perfluoropolyether microemulsion previously obtained by mixing ingredients as detailed in Example 4. The autoclave was then heated to 85° C. Ethyl acetate chain transfer agent (183 kg) was added as a 5.6 wt % solution in water stepwise as a function of VDF consumption. HFP and VDF were then separately introduced in the autoclave so as to ensure a weight ratio HFP/VDF of 2.19 wt/wt and to bring the pressure to 37 bar.

A 0.592% w/w solution of t-butyl hydroperoxide in deionized water was pumped in the reactor at a speed of 129 kg/h (285 lb/h); simultaneously but separately, a 0.592% w/w in L-ascorbic acid water solution was pumped in at the same speed. After about 25 minutes, feeding rate of both t-butyl hydroperoxide and L-ascorbic acid solutions were raised at 147 kg/h (325 lbs/h). Set-point pressure of 37 bar was maintained constant during polymerization by feeding a mixture consisting of VDF and HFP (HFP/VDF=0.6 wt/wt), with an average VDF consumption rate of about 340 kg/h (about 750 lbs/h).

Reaction was continued for 174 minutes, corresponding to the conversion of about 1296 kg (2857 lbs) of VDF, with no fouling.

A VDF-HFP fluoroelastomer substantially free from polar end groups, having a 22.3% moles HFP content and a Mooney viscosity (ML 1+10 at 121° C.) of 21.7 MU was obtained.

The invention claimed is:
1. A fluoroelastomer (A) comprising recurring units derived from vinylidene fluoride and from at least one additional fluorinated monomer, said fluoroelastomer further comprising:
   end groups of formula —CF$_2$H and/or —CF$_2$CH$_3$ in an amount of at most 60 mmoles per kg of fluoroelastomer; and
   polar end groups of formula —CF$_2$CH$_2$OH in an amount of at most 5 mmoles per kg of fluoroelastomer.
2. The fluoroelastomer of claim 1, in which VDF is copolymerized with at least one comonomer selected from:
   (a) C$_2$-C$_8$ perfluoroolefins;
   (b) C$_2$-C$_8$ hydrogenated fluoroolefins;
   (c) C$_2$-C$_8$ chloro and/or bromo and/or iodo-fluoroolefins;
   (d) (per)fluoroalkylvinylethers (PAVE) of formula CF$_2$=CFOR$_f$, wherein R$_f$ is a C$_1$-C$_6$ (per)fluoroalkyl group;
   (e) (per)fluoro-oxy-alkylvinylethers of formula CF$_2$=CFOX, wherein X is a C$_1$-C$_{12}$ ((per)fluoro)-oxyalkyl group comprising catenary oxygen atoms;
   (f) (per)fluorodioxoles having formula:

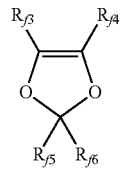

wherein R$_{f3}$, R$_{f4}$, R$_{f5}$, R$_{f6}$, equal or different from each other, are independently selected among fluorine atoms and C$_1$-C$_6$ (per)fluoroalkyl groups, optionally comprising one or more than one oxygen atom; and
   (g) (per)fluoro-methoxy-vinylethers (MOVE) having formula:

CFX$_2$=CX$_2$OCF$_2$OR''$_f$ wherein R''$_f$ is selected among C$_1$-C$_6$ (per)fluoroalkyls, linear or branched; C$_5$-C$_6$ cyclic (per)fluoroalkyls; and C$_2$-C$_6$ (per)fluorooxyalkyls, linear or branched, comprising from 1 to 3 catenary oxygen atoms, and X$_2$=F, H.
3. The fluoroelastomer of claim 1, further comprising recurring units derived from:
   (CSM-1) iodine or bromine containing monomers of formula:

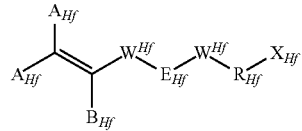

wherein
   each of A$_{Hf}$, equal to or different from each other and at each occurrence, is independently selected from F, Cl, and H;
   B$_{Hf}$ is any of F, Cl, H and OR$^{Hf}_B$, wherein R$^{Hf}_B$ is a branched or straight chain alkyl radical which can be partially, substantially or completely fluorinated or chlorinated;
   each of W$^{Hf}$ equal to or different from each other and at each occurrence, is independently a covalent bond or an oxygen atom;

$E_{Hf}$ is a divalent group having 2 to 10 carbon atoms, optionally fluorinated;

$R_{Hf}$ is a branched or straight chain alkyl radical, which can be partially, substantially or completely fluorinated; and $X_{Hf}$ is a halogen atom selected from the group consisting of iodine and bromine;

which may be inserted with ether linkages; or (CSM-2) ethylenically unsaturated compounds comprising cyanide groups, possibly fluorinated.

4. The fluoroelastomer of claim 1, further comprising recurring units derived from a bis-olefin [bis-olefin (OF)] having general formula:

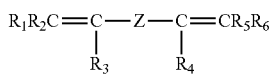

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, optionally fluorinated, or a (per)fluoropolyoxyalkylene radical.

5. The fluoroelastomer of claim 1, wherein the end groups of formula —$CF_2H$ and/or —$CF_2CH_3$ are present in an amount of at most 40 mmoles per kg of fluoroelastomer; and wherein the polar end groups of formula —$CF_2CH_2OH$ are present in an amount of at most 3 mmoles per kg of fluoroelastomer.

6. The fluoroelastomer of claim 2, wherein VDF is copolymerized with at least one comonomer selected from tetrafluoroethylene (TFE), hexafluoropropylene (HFP), hexafluoroisobutylene, vinyl fluoride (VF), trifluoroethylene (TrFE), chlorotrifluoroethylene (CTFE), $CF_2$=$CFOCF_3$, $CF_2$=$CFOC_2F_5$, $CF_2$=$CFOC_3F_7$, $CF_2$=CFOX wherein X is a perfluoro-2-propoxypropyl group, perfluorodioxole, $CF_2$=$CFOCF_2OCF_2CF_3$ (MOVE1), $CF_2$=$CFOCF_2OCF_2CF_2OCF_3$ (MOVE2), $CF_2$=$CFOCF_2OCF_3$ (MOVE3), ethylene and propylene.

7. The fluoroelastomer of claim 1, further comprising at least one comonomer selected from $C_2$-$C_8$ non-fluorinated olefins.

8. A peroxide curable composition comprising the fluoroelastomer (A) according to claim 1 and at least one peroxide.

9. A ionically curable composition comprising the fluoroelastomer (A) according to claim 1 and at least one curing agent and at least one accelerator.

10. Cured articles obtained from the fluoroelastomer (A) according to claim 1.

11. A process for manufacturing the fluoroelastomer of claim 1 having a heat of fusion of less than 5 J/g as measured by ASTM D-3418-08, said method comprising emulsion polymerizing vinylidene fluoride (VDF) in the presence of at least one additional fluorinated monomer, in an aqueous polymerization medium and in the presence of a redox radical initiator system comprising:
at least one organic oxidizing agent [agent (O)]; and
at least one organic reducing agent [agent (R)];
wherein agent (O) is fed to said polymerization medium separately from agent (R), so that agent (O) comes in contact with agent (R) exclusively in said polymerization medium comprising VDF and optional additional monomer(s).

12. The process of claim 11, wherein the organic oxidizing agent [agent (O)] is selected from the group consisting of:
diacylperoxides;
dialkylperoxides;
hydroperoxides;
per-acid esters and salts thereof; and
peroxydicarbonates.

13. The process of claim 12, wherein the organic oxidizing agent [agent (O)] is selected from the group consisting of diacetylperoxide, disuccinyl peroxide, dipropionylperoxide, dibutyrylperoxide, dibenzoylperoxide, benzoylacetylperoxide, diglutaric acid peroxide, dilaurylperoxide, ditertbutylperoxide (DTBP), t-butyl hydroperoxide (TBHP), cumene hydroperoxide, tertiaryamyl-hydroperoxide, an ammonium per-acid ester, a sodium per-acid ester, a potassium per-acid ester, diisopropylperoxydicarbonate, di-n-propylperoxydicarbonate and mixtures thereof.

14. The process of claim 11, wherein the organic reducing agent [agent (R)] is selected from the group consisting of oxalic acid, ascorbic acid, formic acid, malonic acid, citric acid, a reducing sugar, N-nitrosamine, hydroxylamines and mixtures thereof.

15. The process of claim 14, wherein the agent (R) is ascorbic acid.

16. The process of claim 11, wherein the redox radical initiator system comprises at least one transition metal catalyst [agent (P)].

17. The process of claim 16, wherein agent (P) comprises at least one of $Fe^{2+}$, $Cu^{+1}$, $Co^{2+}$, $Ag^+$, and $Ti^{2+}$.

18. The process of claim 16, wherein the agent (P) is selected from salts of $Fe^{2+}$.

19. The process of claim 11, wherein the redox radical initiator system comprises:
at least one organic oxidizing agent [agent (O)];
at least one organic reducing agent [agent (R)];
optionally at least one inorganic oxidizing agent [agent (IO)];
and said redox radical initiator system is substantially free from any salt of $Fe^{2+}$, $Cu^{+1}$, $Co^{2+}$, $Ag^+$, $Ti^{2+}$.

* * * * *